(12) United States Patent
Baumert et al.

(10) Patent No.: US 7,127,052 B1
(45) Date of Patent: Oct. 24, 2006

(54) IMPLEMENTATION OF ADDITIONAL FUNCTIONS FOR USER CONNECTIONS HAVING INDIVIDUALLY CONFIGURED PERFORMANCE CRITERIA

(75) Inventors: Norbert Baumert, Windach (DE); Juergen Lantermann, Munich (DE)

(73) Assignee: Siemens Aktiengesellschaft, München (DE)

( * ) Notice: Subject to any disclaimer, the term of this patent is extended or adjusted under 35 U.S.C. 154(b) by 632 days.

(21) Appl. No.: 10/130,365

(22) PCT Filed: Nov. 16, 2000

(86) PCT No.: PCT/DE00/04061

§ 371 (c)(1),
(2), (4) Date: Sep. 26, 2002

(87) PCT Pub. No.: WO01/39518

PCT Pub. Date: May 31, 2001

(30) Foreign Application Priority Data

Nov. 19, 1999 (DE) ............................... 199 55 761
May 23, 2000 (DE) ............................... 100 25 438

(51) Int. Cl.
*H04M 3/42* (2006.01)
*H04M 7/00* (2006.01)

(52) U.S. Cl. .......................... 379/201.02; 379/221.13; 379/225; 379/230

(58) Field of Classification Search ........... 379/201.01, 379/201.02, 221.08, 221.09, 221.1, 221.12, 379/221.13, 225, 230
See application file for complete search history.

(56) References Cited

U.S. PATENT DOCUMENTS

| | | | |
|---|---|---|---|
| 5,247,571 A | 9/1993 | Kay et al. | |
| 5,276,312 A | 1/1994 | McCarthy | |
| 5,299,260 A | 3/1994 | Shaio | |
| 5,329,523 A | 7/1994 | Saito et al. | |
| 5,422,941 A * | 6/1995 | Hasenauer et al. | 379/246 |
| 5,459,780 A | 10/1995 | Sand | |
| 5,778,060 A | 7/1998 | Otto | |
| 5,896,369 A | 4/1999 | Warsta et al. | |
| 5,946,387 A | 8/1999 | Miloslavsky | |
| 5,987,115 A * | 11/1999 | Petrunka et al. | 379/265.04 |
| 5,987,116 A * | 11/1999 | Petrunka et al. | 379/265.13 |
| 6,018,579 A * | 1/2000 | Petrunka | 379/221.13 |

FOREIGN PATENT DOCUMENTS

| | | |
|---|---|---|
| DE | 195 27 806 C1 | 1/1997 |
| DE | 198 05 686 A1 | 8/1999 |
| EP | 0 903 921 A2 | 3/1999 |
| WO | WO 98/25392 | 6/1998 |
| WO | WO 98/25418 | 6/1998 |

OTHER PUBLICATIONS

XP-000704473: "Routing Service for the Provision of Number Portability."

* cited by examiner

*Primary Examiner*—Harry S. Hong
(74) *Attorney, Agent, or Firm*—Morrison & Foerster LLP

(57) ABSTRACT

At least one part of at least two user connections (TA1 ... 6) having configured performance criteria and being allocated to at least two network devices (LE1 ... 3) is assigned to at least one group (NWHG), to which group-specific performance criteria and/or characteristics (PDN, HUNT) can be allocated. The group (NWHG) is controlled by one of the network devices (LE1), whereby the user connections (TA1, 3, 4, 6) which have not been physically allocated to this network device (LE1) are allocated to said device as virtual user connections.

29 Claims, 4 Drawing Sheets

IMPLEMENTATION OF ADDITIONAL FUNCTIONS FOR USER CONNECTIONS HAVING INDIVIDUALLY CONFIGURED PERFORMANCE CRITERIA

This application is a national stage application of PCT/DE00/04061, filed Nov. 16, 2000, which claims the benefit of priority to German Application Nos. 199 55 761.6, filed Nov. 19, 1999 and 100 25 438.1, filed May 23, 2000.

TECHNICAL FIELD OF THE INVENTION

The present invention relates to implementation of additional functions for subscriber lines having service features.

BACKGROUND OF THE INVENTION

In present-day communication networks, in particular in communication networks configured as a telephone network, it is known not only for private branch exchanges to be connected to public switching devices but also for a number of subscriber lines to be combined to form a "Multi Line Hunting Group"—also referred to hereafter as "MLHG"—replicating the function of a private branch exchange. An MLHG is assigned a group call number or pilot call number—also referred to as "Pilot Directory Number" or "Pilot DN"—shared by all the grouped-together subscriber lines, after the selection of which—for example for setting up a communication relationship with one of the communication terminals assigned to the MLHG—within the group a free subscriber line is found with the aid of a defined search procedure—referred to hereafter as a "Hunting Algorithm"—for setting up the connection.

In the case of an MLHG, the same search procedures or hunting algorithms as in the case of classical private branch exchanges can be used, for example "Sequential Hunting" (selection of the first free subscriber line, always beginning from a defined starting point),
"Circular Hunting/Uniform Call Distribution (continuing the search after the last-found, free subscriber line),
"Non-sequential Hunting" (selection of the subscriber line which has been free for the longest),
"Stochastical Hunting" (selection of a free subscriber line on the random principle).

The MLHG is of interest in particular for small and medium-sized companies which require call distribution in connection with a pilot call number in the manner of a private branch exchange, but do not wish to invest in private switching devices or branch exchanges.

However, an MLHG has the disadvantage that the subscriber lines combined to form an MLHG have to be physically assigned to the same switching device, which means a local restriction of the MLHG or of the group-specific service features provided by the MLHG.

Within the framework of the ITU Specification ITU-T Q.82.4, an extension of the provision of group-specific service features is mentioned, for example extension of search algorithms or hunting algorithms to a number of switching devices or network nodes—, but so far no solution has been disclosed.

Within present-day telephone networks, the signaling for the setting-up and clearing-down of 64-kbit user channel connections for controlling ISDN services takes place on the basis of the ITU-T signaling system No. 7—also referred to as SS NO.7.

The actual task of the signaling protocol No. 7 is the exchange of signaling messages within the communication networks. The signaling messages are exchanged by the user parts within the reference model. Depending on the type of signaling messages, a distinction is made, for example, between the Telephone User Part—TUP the Data User Part—DUP—, the ISDN User Part—ISUP—and the Broadband ISDN User Part—B-ISUP. The TUP was implemented as the first application in the signaling protocol No. 7. Building on the basis of the TUP for generally establishing the ISDN and for establishing the signaling within the ISDN, the ISUP was defined.

The ISUP gave rise, as the latest application, to the B-ISUP for applications within ATM-based networks. The main tasks of the ISUP are:

setting up and clearing down user channel connections,
handling the signaling for supplementary services,
coupling two "logical" signaling connections (for example on transfer from the national network into the international network).

The ISDN user part makes use directly of the message transfer part—MTP—and of the control part for signaling connections—SCCP, layer 4—, the ISUP itself is consequently to be classified as belonging to layers 4 to 7 in the OSI reference model. The ISDN user part controls both the link-by-link signaling for reaching the destination and the end-to-end signaling relationship between the originating switching point and the destination switching point. With the aid of the link-by-link signaling, the path for the user channel connection and the signaling connection is sought and, after corresponding commands, is set up. The MTP is used for this purpose. For the user channel connection, all the involved switching points must be informed, for example about the switching through of the user channel, while only the originating switching point and the destination switching point exchange signaling information for the control of the supplementary services. For the end-to-end signaling, the ISUP makes use of the services of the SCCP. In the ISDN user part, the actual signaling information is exchanged. All the lower-lying layers ensure that this information is transferred in an acknowledged form and reaches the addressed user part. For the exchange of the end-to-end signaling messages for handling ISDN supplementary services, the end-to-end signaling of the SCCP is used on the basis of a TCAP dialog.

For more complex applications within communication networks, such as for example for supporting data bank inquiries in the case of services of the Intelligent Network—also referred to as IN—or in the case of mobile radio applications, the Transaction Capabilities Application Part—TCAP—was introduced into signaling procedure No. 7. For example, the freephone service of the Intelligent Network is used by the initiator of the connection to dial an IN call number (0130 or 0800), which determines a destination call number by a call to the Intelligent Network in dependence on the customer parameters. For the determination of the valid destination call number, only signaling messages have to be exchanged; the user channel is not switched to the IN. This service call is, for example, a typical TCAP application. In the communication of TCAP entities, a distinction is made between structured dialog and unstructured dialog. In the case of structured transport, a transaction relationship is commenced before the exchange of messages and the transaction identification—also referred to as transaction ID—is issued in both communication devices of the two signaling nodes involved for the identification of this relationship. After a BEGIN message, individual items of information are transferred in the structured dialog by CONTINUE messages. The BEGIN message contains the transaction identification of the initiator, the CONTINUE messages contain, according to the direction of transfer, the identification of the initiator or that of the communication partner as the originating identification and the identification of the communication partner as the destination identification. After the transfer of information, the dialog is routinely ended by the END message. The structured dialog is used, for example, for data bank inquiries, such as for example in mobile radio networks or in the IN; all the exchanged messages can be marked by the transaction identification as belonging to this activity.

An intelligent network or IN is a concept comparable to an architecture for introducing complex services into existing telecommunication networks, the architecture describing the structure of an actual IN implementation. The architecture is designed in such a way that it is suitable as a uniform basis for a large number of different services. Supplementing the conventional telecommunication networks, the architecture of intelligent networks represents a platform on which the actual services are based. In the standardization, three (physical) levels were established, to which the various components and functions of the conceptual model of an Intelligent Network are assigned.

The platform implemented by the architecture of the IN comprises not only hardware components, but also a software platform, on which very specific services can be developed by the IN operators by means of suitable aids and can be loaded into the hardware components. The hardware of intelligent networks primarily comprises switching points of the telephone network—also referred to as SSP or Service Switching Points, which detect the actual call of an IN service and direct it to a corresponding SCP—also referred to as a Service Control Point. The actual service runs on an SCP, a very powerful computer with a large, complex data bank, by which many inquiries can be handled in a short time. For the operation of the services, a further level is required, which is also referred to as the SMP or Service Management Point. The SMPs can be used by service customers to dial into the Intelligent Network and change or adapt their respective setting data or parameters for the respective service.

A service switching point implementing service switching functions detects IN calls and forwards the inquiries to the corresponding SCP. The SCP is a digital switching point with special control programs (for example all telecommunication points of a specific level). The call of an IN function is coupled in the control of the switching point by means of predefined triggers. In this case, not only certain call numbers can represent a so-called trigger point—also referred to as a trigger detection point—, it is also possible for certain states of the connection—for example encountering a busy subscriber, subscriber does not answer and so on—to be coupled with IN trigger points. In the simplest case, just the lifting of a telephone without further dialing is enough to initiate an IN trigger. Further actions—for example dialing the call number—can already be assessed by IN. The communication of a number of SSPs with an SCP takes place by means of No. 7 messages, for example by means of TCAP or INAP dialog.

In an SCP or Service Control Point, functions for detecting and controlling IN services are implemented. An SCP is formed by one or more computer systems, by which the IN services are detected and correspondingly controlled. An SCP forwards for example the traffic routing information to the corresponding SSP and determines the charges incurred for the use of the corresponding ISDN services.

The IN services of the SCP are set up, changed, managed and monitored by the Service Management Point or SSP implementing the service management functions, it being possible for all the parameters—for example call numbers, time dependence etc.—to be set and changed by means of the SMP.

The IN elements described—SSP, SCP, SMP—essentially influence the control of connections within a communication network. With the aid of the signaling protocol No. 7, the signaling of the connections to the SCP to be switched within the communication network is diverted, but not the user channels.

The user channels are switched within the telecommunication network on the basis of the control functions implemented by the IN. For certain services, however, inclusion of the user channels is also required. For example, if subscriber inquiries have to be carried out, certain announcements controlled by the IN system have to be activated and, if appropriate, responses to a predetermined possible selection or an identification of the subscriber have to be recorded. The responses of the user are often given in the form of DTMF signals, which are likewise sent in the user channel. For these special tasks, special devices are provided within the IN architecture, having the user channels on one side and signaling connections to the IN on the other side. Such special devices are referred to as Intelligent Peripherals or IPs. These do not have to be restricted to the playing of predetermined announcements or the recording of DTMF signals. In future, systems of this type can also be extended to voice recognition systems or data-oriented systems. The bringing together of different IN functions, in particular the functions of SCP and SSP, is also referred to as a Service Node or SN.

SUMMARY OF THE INVENTION

The invention improves the provision of service features implementing the function of a private branch exchange. Th In one embodiment according to the invention, subscriber lines having respectively configured subscriber service features are physically assigned to a number of interconnected switching devices. One aspect of the the invention is that at least some of the subscriber lines of at least two switching devices are assigned to at least one group. The at least one group can be assigned group-individual service features and/or group-individual characteristics, the service features and/or characteristics assigned to the group being controlled by one of the switching devices. In the switching device controlling the group, the subscriber lines of the group not physically assigned to this switching device are assigned as virtual subscriber lines.

One advantage according to the invention is that individually configured subscriber lines already installed in a number of switching devices can be extended in a simple and cost-effective way by adding additional functions, with the already implemented subscriber service features continuing to be available. Within the scope of the invention, new attractive service features and characteristics can be provided for the connected subscribers or communication terminals in a low-cost way—for example by updating the control software of the switching devices without procuring additional hardware components. In particular in the sphere of smaller and medium-sized companies, whose offices and business premises are spatially distributed, already existing subscriber lines can be extended by adding additional service features, for example conforming to private branch exchanges, while retaining the already configured service features individual to the subscriber line, so that procurement of a private branch exchange is no longer required. The low-cost provision of new, attractive service features achieves added value for the operators of communication networks, in particular telephone networks, bringing with it, for example, an increase in sales revenue and also a chance for them to set themselves apart from competitors.

According to another embodiment according to the invention, the switching devices are administered in such a way that communication relationships from and to the subscriber lines which are not physically assigned to the switching devices controlling the group are switched in the telecommunication sense by means of the switching device controlling the group. In the switching device controlling the group, the respective current switching and operational state of the subscriber lines physically assigned to it and of the virtual subscriber lines is registered, with the group-individual service features and/or characteristics assigned to the subscriber lines being controlled in dependence on the respectively registered, operational and switching states.

In this case, the communication relationships to be set up from and to the subscriber lines assigned to the group or from and to the communication terminals connected to them are routed via the switching device controlling the group or via a control switching device. This is also referred to as "call channeling". The "call channeling" allows the respective current switching and operational state of the individual subscriber lines or communication terminals to be registered by the switching device controlling the group—also referred to as "busy/idle handling". The switching information registered in this way is stored in corresponding data records in the switching device controlling the group.

According to still another embodiment according to the invention, the switching devices are administered in such a way that the current switching and operational states of the subscriber lines not physically assigned to the switching device controlling the group are transmitted to the switching device controlling the group, or each change of the switching and operational state of the subscriber lines not physically assigned to the switching device controlling the group is transmitted to the switching device controlling the group. In the switching device controlling the group, the respective current switching and operational state of the subscriber lines physically assigned to it and of the virtual subscriber lines is registered. In dependence on the respectively registered operational and switching states, the group-individual service features and/or characteristics assigned to the subscriber lines are controlled.

In this case, the concept-related disadvantage of the "call channeling", in which incoming and outgoing calls from and to the subscriber lines not physically assigned to the switching device controlling the group have to be switched by means of the switching device controlling the group—also referred to as "tromboning"—is avoided. The switching of the each change of the switching and operational state of the subscriber lines not physically assigned to the switching device controlling the group to the switching device controlling the group avoids the unnecessary usage of network resources or connection channels.

According to yet another embodiment according to the invention, the group is assigned at least one group-individual waiting queue. In the event that no free subscriber line is found within the search procedure, the communication relationship is made to wait in turn in the at least one waiting queue. After finding a free subscriber line, the communication relationship is taken from the waiting queue and forwarded to the free subscriber line. This advantageous development prevents a communication connection being rejected in the busy case.

Advantageously, a subscriber line provides at least one user data channel which can be switched within the search procedure for the transmission of information the number of user data channels which can be switched within the search procedure for the subscriber line in the case of a subscriber line having a number of user data channels being individually predeterminable. This advantageous configuration makes it possible to prevent the user data channels provided by a subscriber line being busy within the search procedure, i.e. under the assigned group call number. As a result, for a subscriber line, at least one user data channel can be reserved for the direct selection of a subscriber outside the group search procedure or for outgoing communication relationships.

According to another embodiment, the subscriber line is assigned at least one subscriber call number, the number of user data channels used simultaneously under a subscriber call number within the search procedure being individually predeterminable. This advantageous emboidment prevents a number of connections or communication relationships being simultaneously conducted or switched under a subscriber call number within the search procedure. As a result, the rejection of an incoming communication relationship, by for example a subscriber call number already having the switching state of "busy", is prevented within the search procedure.

BRIEF DESCRIPTION OF THE DRAWINGS

The invention is explained below in more detail with reference to the exemplary embodiments and several drawings, in which:

FIG. 5 shows an embodiment of the call channeling of communication relationships to be switched in the direction of external subscriber lines by means of the switching service feature "automatic call diversion" from the external subscriber lines to the control switching device.

FIG. 6 shows an embodiment according to the invention, in which, instead of the call channeling, the current busy states of the external subscriber lines are transmitted to the control switching device.

DETAILED DESCRIPTION OF THE INVENTION

Figure 1:
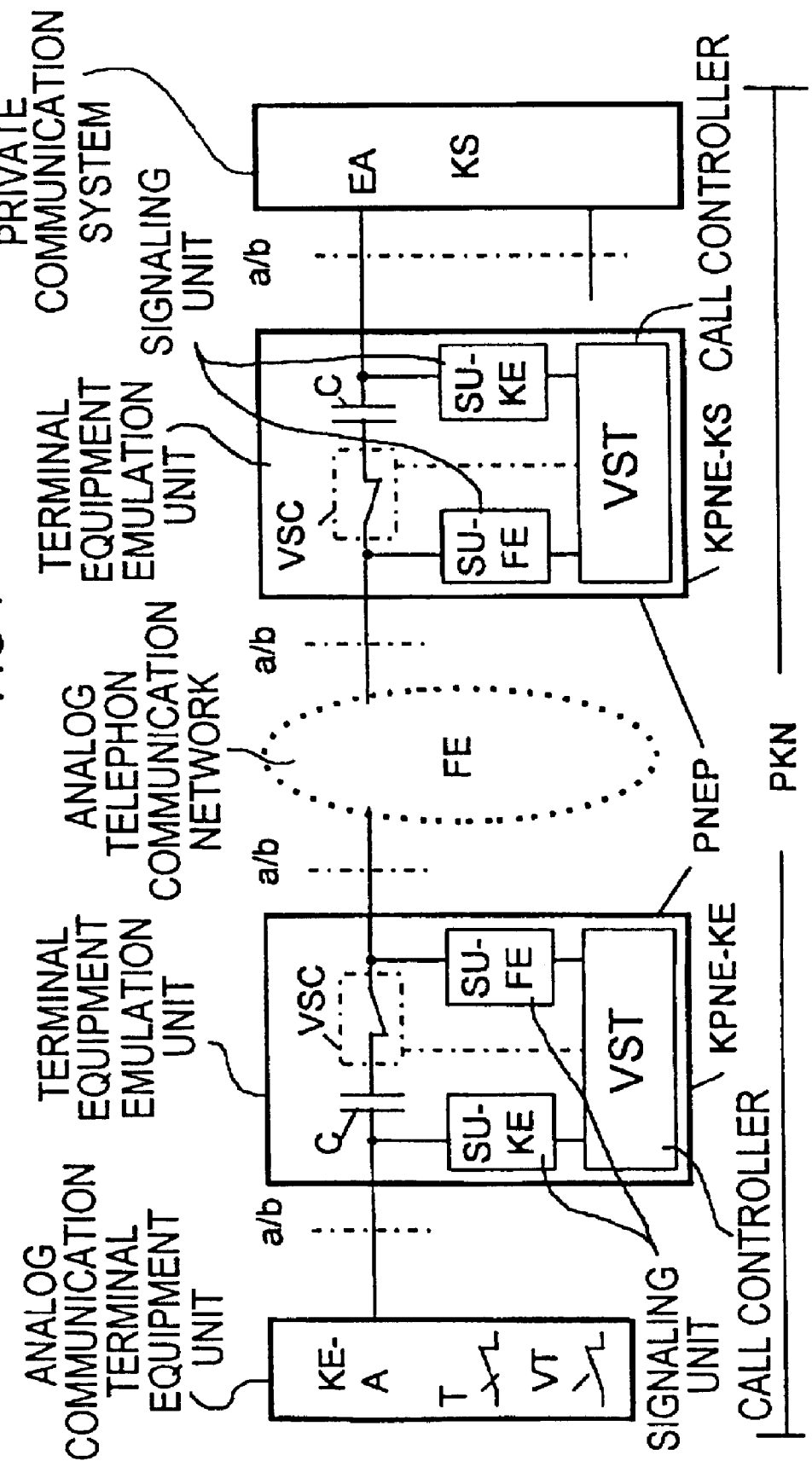
FIG. 1 shows a number of interconnected switching devices arranged in a communication network, with a number of physically assigned subscriber lines, which are assigned within the method according to the invention to at least one group, the group being controlled by a control switching device.

FIG. 1 shows in a block diagram a number of switching devices LE1 . . . 3 which are arranged in a communication network, and are interconnected or intermeshed via line trunk groups AG and inter-exchange lines TR1 . . . 3. The intermeshed switching devices LE1 . . . 3 are connected via further line trunk group AG to the higher-level communication network KN, formed for example as a telephone network. Arranged in the communication network KN are a number of communication terminals KE1 . . . 6, which are connected via an access line AL in each case and a subscriber line TA1 . . . 6 in each case to the switching devices LE1 . . . 6 represented in FIG. 1. In this exemplary embodiment, the first communication terminal KE1 is configured as an ISDN-conformal communication terminal—for example an ISDN telephone or personal computer with an integrated ISDN card. The first communication terminal KE1 is connected via the first subscriber line TA1, configured as an ISDN basic access, to the second switching device LE2. The first communication terminal KE1 is assigned a first subscriber call number DN1, by which the first communication terminal KE1 is uniquely addressed within the communication network KN. The second communication terminal KE2 is likewise configured as an ISDN-conformal communication terminal and connected via the second subscriber line TA2, configured as an ISDN basic access, to the first switching device LE1. The second communication terminal KE2 is assigned a second subscriber call number DN2. The third communication terminal KE3 is configured as an analog telephone terminal and connected via the analog access line AL and via the analog third subscriber line TA3 to the second switching device LE2. The third communication terminal KE3 is assigned a third subscriber call number DN3. The fourth communication terminal KE4 is configured as a mobile, wireless communication terminal or cell phone and connected via a wireless transmission channel and via a fourth subscriber line TA4, configured as a mobile radio subscriber line, to the third switching device LE3. The fourth communication terminal KE4 is assigned a fourth subscriber call number DN4. The fifth communication terminal KE5 is configured as a digital communication terminal—for example a personal computer—, which is connected via an access line AL, configured as an ADSL line—Asymmetrical Digital Subscriber Line—and connected via a fifth subscriber line TA5 to the first switching device LE1. The fifth communication terminal KE5 is assigned a fifth subscriber call number DN5. The sixth communication terminal KE6 is configured as an ISDN-conformal communication terminal, which is connected via the sixth subscriber line TA6, configured as an ISDN basic access, to the third switching device LE3.

The sixth communication terminal KE6 is assigned a sixth subscriber call number DN6. The three switching devices LE1 . . . 3 each have a database DB, in which items of information relating individually to the subscriber lines are respectively stored. Items of information relating individually to the subscriber lines are, for example, the subscriber call numbers DN1 . . . 6 assigned to the respective subscriber lines TA1 . . . 6, information representing the respective configuration or type of subscriber line—for example analog line, ISDN basic access, ISDN primary rate access, ADSL access and mobile-radio-conformal subscriber line—, and information representing the subscriber service features configured individually for the respective subscriber lines TA1 . . . 6.

For the further exemplary embodiment, it shall be assumed that the communication terminals KE1 . . . 6 connected to the three switching devices LE1 . . . 6 are combined to form a group NWHG, it being intended for group-specific service features to be provided for the communication terminals KE1 . . . 6 assigned to the group NWHG. Examples of the group-specific service features are, for example, the service features provided by private branch exchanges, such as assigning a group-individual pilot call number PDN or "pilot DN" and a search procedure assigned to the group—also referred to as a hunting algorithm—for finding a free subscriber line TA1 . . . 6 within the group NWHG.

The combination according to the invention of the communication terminals KE1 . . . 6 connected to the different switching devices LE1 . . . 3, and the combination of the subscriber lines TA1 . . . 6 assigned to physically different switching devices LE1 . . . 3, takes place in several steps. According to the invention, differently configured subscriber lines TA1 . . . 6, i.e. ISDN basic accesses, ISDN primary rate accesses and subscriber lines implementing an xDSL transmission method, can be assigned to a higher-level group NWHG. The subscriber lines TA1 . . . 6 to be combined to form a group NWHG may already have service features relating individually to subscriber lines. Examples of service features relating individually to subscriber lines are the ISDN Supplementary Service "Multiple Subscriber Number MSN" and the comparable analog service features "Primary DN" and "Secondary DN". In conjunction with the stated service features, further service features, such as an unlisted call number or bell signal, can also be used in dependence on the selected subscriber call number. The service features relating individually to subscriber lines can be individually configured—for example with regard to types of rerouting and rerouting destinations—for the various types of information to be transmitted—for example voice, fax, data.

In a first step, it is determined by which of the switching devices LE1 . . . 3 the management or control of the group NWHG to be formed is to be performed. In this exemplary embodiment, the group NWHG to be formed is to be controlled by the first switching device LE1. Hereafter, the first switching device, controlling the group NWHG, is also referred to as the control switching device LE1. Alternatively, the group NWHG may also be controlled by a further switching device—not represented—arranged in the communication network KN. For implementing the group NWHG, an organization unit OGRP, representing the group NWHG, is set up and stored in the database DB of the first switching device LE1. In the organization unit OGRP, representing the group NWHG, the assigned group-individual pilot call number PDN and information HUNT representing the selected search procedure are stored. Further group-individual information, by which further group-individual characteristics to be assigned to the group NWHG can be determined or defined, can be stored in the organization unit OGRP.

The subscriber lines which are to be assigned to the group NWHG but are not physically arranged in the control switching device LE1—here TA1, TA3, TA6, TA4—are assigned as virtual subscriber lines by administration of the control switching device LE1. For the virtually assigned subscriber lines TA1, TA3, TA6, TA4, addressing information TR1,2, by means of which a communication relationship can be respectively set up by the control switching device LE1 to the respective subscriber lines TA1,3,4,6 not physically arranged in the control switching device LE1, is provided in the database DB of the control switching device LE1. Hereafter, the subscriber lines TA1,3,4,6 not physically assigned to the control switching device are also referred to as external subscriber lines. For the virtual subscriber lines TA1, TA3, TA6, TA4, further management or addressing information is provided in the database DB of the control switching device LE1—for example the subscriber call numbers DN1, DN3, DN6, DN4 assigned to the external subscriber lines TA1,3,4,6, which are required for an A-side access authorization check or for B-side call offering.

The virtual subscriber lines TA1, TA3, TA6, TA4 to be assigned to the group NWHG and the subscriber lines TA2, TA5 physically assigned to the control switching device LE3 are linked with the organization unit OGRP. For this purpose, items of information representing the corresponding subscriber lines TA2,5 and the corresponding, virtual subscriber lines TA1,3,4,6 are stored in the organization unit OGRP. For example, the subscriber call numbers DN1 . . . 6 assigned to the respective subscriber lines TA1 . . . 6 are stored in the organization unit OGRP, with an assignment of the addressing information TR1,3 and of the corresponding subscriber call numbers DN1,3,4,6 being assigned for the virtual subscriber lines TA1,3,4,6.

The linking with the organization unit OGRP allows each subscriber line TA1 . . . 6 to be reached both via the respective subscriber-line-individual subscriber call numbers DN1 . . . 6 and via the pilot call numbers PDN assigned to the group NWHG—if the respective subscriber line TA1 . . . 6 is selected with the aid of the search procedure. If the pilot call number PDN assigned to the group NWHG is selected, the group-individual service features or characteristics currently assigned to the group NWHG or the organization unit OGRP apply. When selecting one of the subscriber-line-individual subscriber call numbers DN1 . . . 6 assigned to the subscriber lines TA1 . . . 6, the subscriber-line-individual service features assigned to the respective subscriber line TA1 . . . 6 apply. When setting up a communication relationship initiated by the communication terminal KE1 . . . 6, the subscriber service features assigned to the respective signaled call number apply; alternatively, the respective service features of that subscriber call number which was administratively preset may also apply.

In the following text, the linking of the subscriber lines TA1 . . . 6 combining to form the group NWHG within the organization unit OGRP is explained in more detail. In the organization unit OGRP, a data record DS1 . . . 6 is provided for each member of the group NWHG, i.e. for each assigned subscriber line TA1 . . . 6. In the first data record DS1, information representing the external first subscriber line TA1 is stored. In addition to the subscriber call number DN1 assigned to the first subscriber line TA1, an item of information identifying the first subscriber line TA1 as a virtual subscriber line—here "virt"—and an item of information representing the type of the first subscriber line TA1—here ISDN basic access="ba"—and a corresponding item of addressing information—here an item of information "trk1"—representing the first interexchange line TR1 are stored. Furthermore, an item of information "b/i", representing the current switching and operational state, is stored in the first data record DS1.

In the second data record DS2, the subscriber call number DN2 assigned to the second subscriber line TA2 is stored. Furthermore, an item of information "real", identifying the second subscriber line TA2 as real, i.e. a subscriber line physically assigned to the control switching device, and an item of information "ba", representing an ISDN basic access, are stored in the second data record DS2. The remaining entries, represented in FIG. 1, in the data records DS3–DS6 are self-explanatory. For instance, the third subscriber line TA3 is identified as a virtual, analog subscriber line which is connected via the first interexchange line TR1 to the control switching device LE1. The fourth subscriber line TA4 is identified as a virtual, mobile-radio-conformal subscriber line which is connected via the second interexchange line TR2 to the control switching device LE1. The fifth subscriber line TA5 is identified as a real subscriber line, i.e. a subscriber line physically assigned to the control switching device LE1, which is configured in accordance with the ADSL transmission method. The sixth subscriber line TA6 is identified as a virtual ISDN basic access which is connected via the second inter-exchange line TR2 to the control switching device LE1.

For the implementation of the method according to the invention it is required that all the communication relationships to be set up from and to the subscriber lines TA1 . . . 6 assigned to the group NWHG or from and to the communication terminals connected to them are routed via the control switching device LE1. This is also referred to as "call channeling". The "call channeling" allows the respective current switching and operational state of the subscriber lines TA1 . . . 6 or communication terminals KE1 . . . 6 to be registered by the control switching device LE1—also referred to as "busy/idle handling"—and stored as switching information bi in the respective data records DS1 . . . 6 of the organization unit OGRP. The current operational and switching state of the respective subscriber lines TA1 . . . 6 is required for properly carrying out the search procedure for finding a free subscriber line TA1 . . . 6 within the group NWHG.

The call channeling can be implemented in different ways, the respective databases DB of the three switching devices LE1 . . . 3, and optionally the databases of further switching devices—not represented—arranged in the communication network KN, being set by administration in such a way that communication relationships or incoming and outgoing calls from and to the external subscriber lines TA1,3,4,6 assigned to the group NWHG are always switched via the control switching device LE1.

Figure 2:
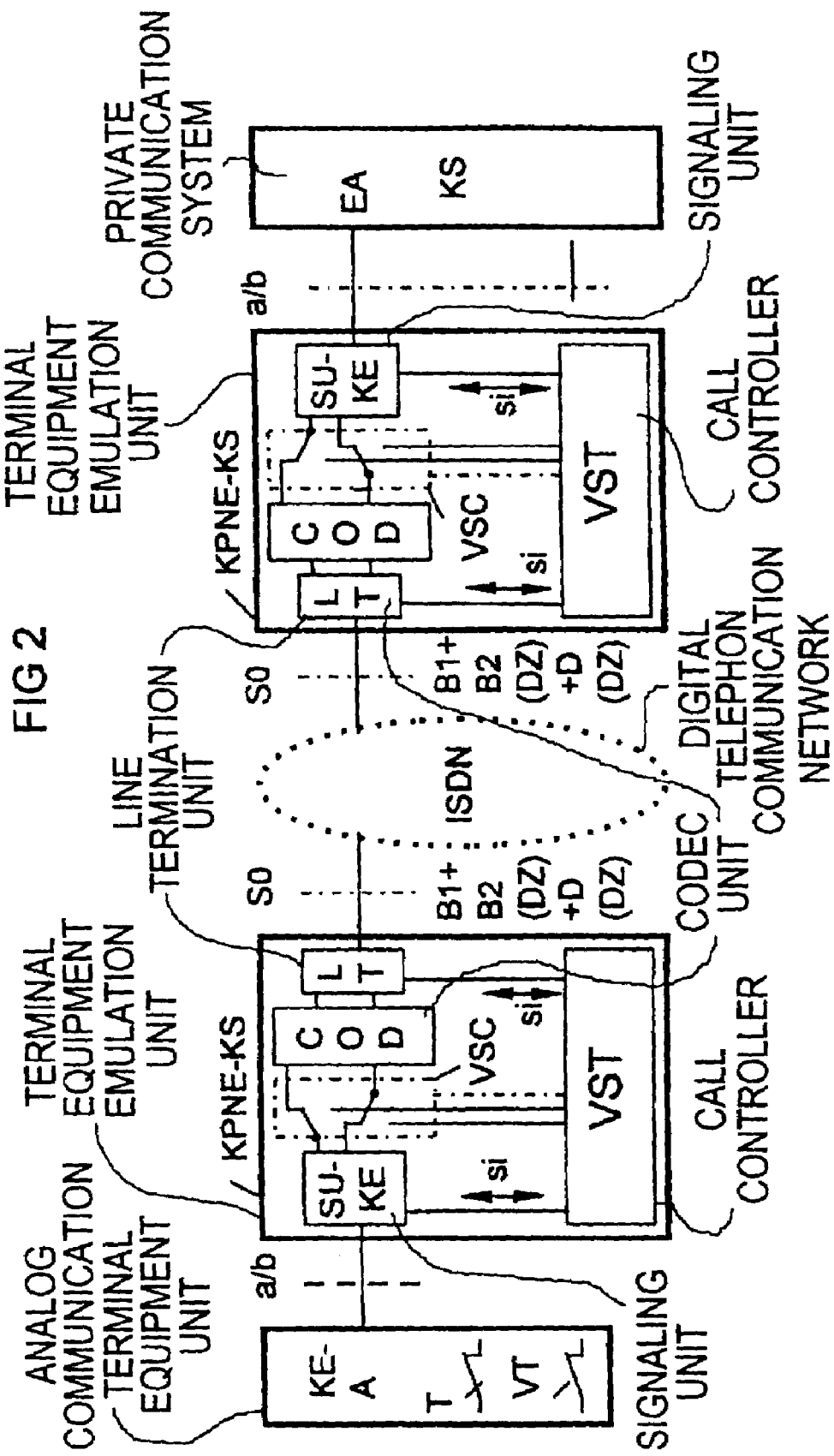
FIG. 2 shows call channeling implemented within the invention for communication relationships originating from subscriber lines via the control switching device.

FIG. 2 shows the call channeling for communication relationships originating from external subscriber lines TA1, 3,4,6. In FIG. 2, a setup of a communication relationship initiated by the third communication terminal KE3 is represented by way of example. In switching devices—here LE2 and LE3—, with external subscriber lines TA1,3,4,6 assigned to the group NWHG arranged in them, special "ACCESS codes" PREFIX are set up. This "ACCESS code" is put in front of the destination call number—here B-DN—of the desired B subscriber in the setup of a communication relationship initiated by an external subscriber line TA1,3, 4,6 of the group NWHG—here TA3—here PREFIX+B-DN. By prefixing the "ACCESS code", the communication relationship to be set up is switched or routed to the control switching device LE1—illustrated by a first arrow. An "ACCESS code" is comparable with the "carrier access codes", with which for example alternative network operators can be selected in present-day deregulated communication networks. This method is also referred to as the "call-by-call method". The "call-by-call method" is supported by all switching devices used in present-day, deregulated communication networks. To avoid manual input of the "ACCESS code", a further "preselection" function, known in present-day deregulated communication networks, can be used. In the case of the "preselection" method, the preset "ACCESS code" is automatically inserted before the selected B call number of the desired subscriber by the respective switching device LE2,3 for every outgoing call. The user of the "preselection" method must be correspondingly identified. The communication relationships switched via the inter-exchange lines to the control switching device LE1 are identified by an identification method referred to as "screening" on the basis of the transmitted A call number—here DN3. The transmitting of the A call number takes place for example as part of the switching service "Calling Line Identification", CLI. With the aid of the transmitted A call number DN3, the corresponding data record—here DS3—in the organization unit OGRP is found in the database DB of the control switching device LE1 and the respective subscriber line TA3 is identified as a virtual subscriber line—illustrated by a second arrow. Subsequently, the communication relationship is forwarded to the destination call number B-DN or into the communication network KN—illustrated by a third arrow.

Figure 3:
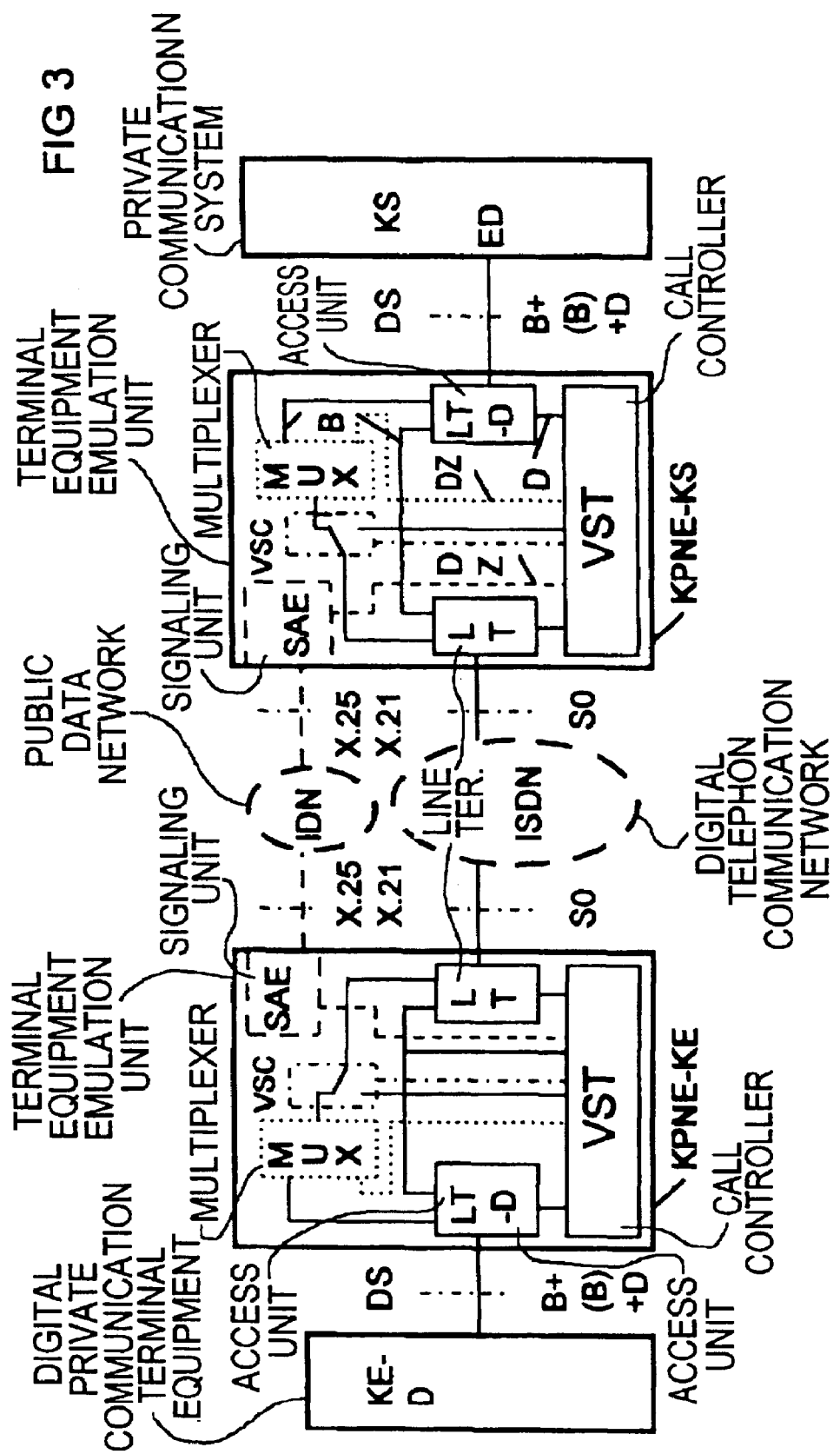
FIG. 3 shows an embodiment of the call channeling of communication relationships to be switched in the direction of subscriber lines by means of modification of the subscriber call numbers and by means of administrative adaptation of the routing within the communication network.

FIG. 3 shows a first implementational variant of the call channeling of communication relationships to be switched in the direction of external subscriber lines TA1,3,4,6 by means of modification of the subscriber call numbers and by means of administrative adaptation of the routing within the communication network KN. The subscriber call numbers DN1, DN3, DN6, DN4 of the external subscriber lines TA1, TA3, TA6, TA4 arranged in the second and third switching devices LE2, LE3 or the subscriber call numbers DN1, DN3, DN6, DN4 of the communication terminals KE1,3,4,6 are administratively modified in such a way that they can no longer be dialed up directly, i.e. from the communication network KN, but can still be used for the routing or switching between the switching devices LE2, LE3 and the control switching device LE1. The modified subscriber call numbers—also referred to as virtual subscriber call numbers, here DN1$n$, DN3$n$, DN4$n$, DN6$n$—are derived for example by means of a simple algorithm from the original subscriber call numbers DN1,3,4,6 and stored in the databases DB of the switching devices LE1 . . . 3. The modification of the subscriber call numbers DN1, DN3, DN6, DN4 can be achieved, for example, by the respective subscriber call number being prefixed by a digit from the hexadecimal range of numbers. For example, a subscriber call number DNX=72 26 14 90 is converted into the correspondingly modified subscriber call number DNX$n$=E72 26 14 90. The original subscriber call numbers DN1, DN3, DN6, DN4 of the external subscriber lines TA1, TA3, TA6, TA4 are assigned to the corresponding virtual subscriber line in the control switching device LE1 or stored in the corresponding data record DS1, DS3, DS6, DS4 of the organization unit OGRP and assigned to the corresponding virtual subscriber call number DN1, DN3$n$, DN4$n$, DN5$n$. Furthermore, the routing tables—not represented—arranged in the communication network KN are adapted in such a way that selection of the subscriber call numbers originally assigned to an external subscriber line TA1,3,4,6—here DN3—leads to a connection to the control switching device LE1—illustrated by a first arrow. After a verification of the current switching state of the virtual subscriber line assigned to the selected subscriber line TA3 by evaluation of the corresponding switching information bi in the corresponding data record—here DS3—, if a free subscriber line TA3 is found, the desired communication relationship is forwarded by the control switching device LE1 via the first inter-exchange line TA1 to the third subscriber line TA3 with the aid of the addressing information or virtual subscriber call number TR1,DN3$n$ stored in the data record DS3—illustrated by a second arrow.

Figure 4:
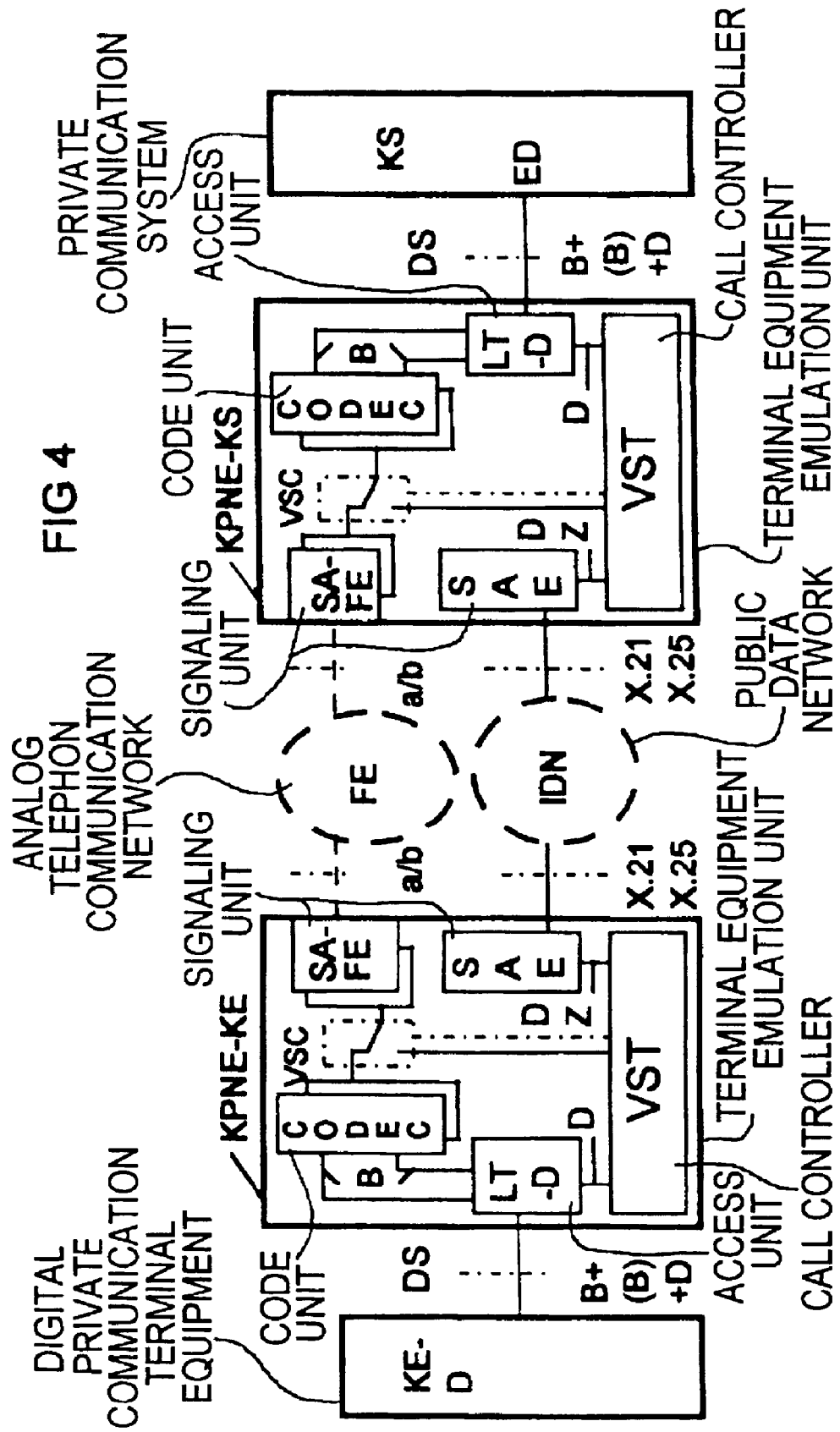
FIG. 4 shows an embodiment of the call channeling of communication relationships to be switched in the direction of external subscriber lines by means of modification of the subscriber call numbers and utilization of the switching service feature "number portability".

FIG. 4 shows a second implementational variant of the call channeling of communication relationships to be switched in the direction of external subscriber lines TA1, 3,4,6 by means of modification of the subscriber call number DN1,3,4,6 and utilization of the switching service feature "number portability". As already described in the first implementational variant, the subscriber call numbers DN1, DN3, DN6, DN4 of the external subscriber lines TA1, TA3, TA6, TA4 arranged in the second and third switching devices LE2, LE3 are modified by administration in such a way that they can no longer be dialed up directly, i.e. from the communication network KN, but can still be used for the routing or switching between the switching devices LE2, LE3 and the control switching device LE1. The subscriber call numbers DN1, DN3, DN4, DN6 originally assigned to the external subscriber lines TA1, TA3, TA4, TA6 are identified as "ported", with a corresponding item of information—here "LP", representing the porting, being stored in the database DB of the second and third switching devices LE2, LE3. The subscriber lines TA1, TA3, TA4, TA6 identified as ported are assigned a further porting subscriber call number DN1$p$, DN3$p$, DN4$p$, DN6$p$, which are stored both in the higher-level communication network KN and in the corresponding data records DS1,3,4,6 of the organization unit OGRP. When setting up a communication relationship from the communication network KN using the original subscriber call number—here DN3—the communication relationship is firstly switched to the corresponding second switching device LE2, having the selected subscriber line—here TA3—illustrated by a first arrow. As a result of the fact that the selected subscriber line TA3 is identified as ported, the communication relationship is switched back by the second switching device LE2 into the communication network KN, with additional information—here for example "CV#25:LP"—being transmitted to components arranged in the communication network KN and implementing functions of an "Intelligent Network"—for example an SCP, Service Control Point. Within the functions provided by the Intelligent Network, the further porting subscriber call number assigned to the original subscriber call number DN3—here DN3$p$—is determined, and used for forwarding the communication relationship to the control switching device LE3—illustrated by a third arrow. In the control switching device LE3, the selected porting subscriber call number DN3$p$ is identified in the organization unit OGRP as a member of the group NWHG and, after a verification of the current switching and operational state of the corresponding subscriber line TA3, the communication relationship is forwarded via the first inter-exchange line TR1 to the third subscriber line TA3 with the aid of the addressing information or virtual subscriber call number trk1,DN3$n$ stored in the corresponding data record DS3—illustrated by a fourth arrow.

FIG. 5 shows a third implementational variant of the call channeling of communication relationships to be switched in the direction of external subscriber lines TA1,3,4,6 by means of "automatic call diversion" from external subscriber lines TA1, TA3, TA4, TA6 to the control switching device LE1. The "automatic call diversion"—also referred to as "Exchange Controlled Call Forwarding", ECCF—represents a switching service feature provided by switching devices. As already described in the two first implementational variants, the subscriber call numbers DN1, DN3, DN6, DN4 of the external subscriber lines TA1, TA3, TA4, TA6 arranged in the second and third switching devices LE2, LE3 are modified by administration in such a way that they can no longer be dialed up directly, i.e. from the communication network KN, but can still be used for the routing or switching between the switching devices LE2, LE3 and the control switching device LE1. Furthermore, an unconditional call diversion to the control switching device LE1 is set up for the subscriber call numbers DN1, DN3, DN6, DN4 originally assigned to the subscriber lines TA1, TA3, TA4, TA6 and corresponding information—here ECCF—is stored in the databases DB of the second and third switching devices LE2,3. This is achieved, for example, by the assignment of a corresponding item of routing information—here DN1f, DN3f, DN4f, DN6f—to the respective subscriber lines TA1,3,4,6, with the routing information DN1f, DN3f, DN4f, DN6f being stored in the databases DB of the second and third switching devices LE1,2 and additionally in the corresponding data records DS1, DS3, DS4, DS6 of the organization unit OGRP. If, for example, a communication relationship is to be switched from the communication network KN to the third subscriber line TA3, this communication relationship is switched on the basis of the selected subscriber call number DN3 firstly to the second switching device LE2, having the selected subscriber line TA3—illustrated by a first arrow. The unconditional call diversion—here for example "DN3: ECCF→DN3f"—stored in the database DB of the first switching device LE1 has the effect that the communication relationship is diverted or forwarded to the control switching device LE1—illustrated by the second arrow. With the aid of the information transmitted within the diverted communication relationship—here DN3f—the corresponding data record DN3 is found by the control switching device LE1 in the organization unit OGRP and the communication relationship is forwarded via the first inter-exchange line TR1 to the third subscriber line TA3 with the aid of the addressing information trk1,DN3n stored in the data record DN3—illustrated by a third arrow.

The configurational variants represented in FIG. 2, FIG. 3 and FIG. 4 and FIG. 5 for implementing the call channeling are based on standard switching functions which are provided by all modern switching devices used in present-day communication networks.

After the linking of the subscriber lines TA1 . . . 6 in the organization unit OGRP, the subscriber lines TA1 . . . 6 assigned to the group NWHG are identified by administration as free and corresponding items of information b/i are stored in the respective data records DS1 . . . 6 of the organization unit OGRP. In a transient period after the setting-up of the group NWHG, however, the case can occur that the subscriber lines TA1, TA3, TA6, TA4 not physically assigned to the control switching device currently have the switching state "busy", but are identified as free in the organization unit OGRP. For this case, automatic correction procedures must ensure that the items of information b/i stored in the respective data records DS1,3,4,6 of the organization unit OGRP and representing the current switching state are correspondingly corrected or synchronized.

In the case of the implementational variant of the call channeling described, all communication relationships disadvantageously have to be switched via the control switching device LE1. The central switching via the control switching device LE1 is required since the current switching and operational states of the external subscriber lines TA1, TA3, TA6, TA4 have to be registered by said device. As already explained, network resources are wasted in call channeling by "tromboning", which in the case of groups that are spatially widely distributed is no longer acceptable.

In the following text, an alternative configurational variant for implementing the method according to the invention is described—schematically represented in FIG. 6—in which tromboning is avoided. This alternative implementational variant presupposes that the switching devices LE1 . . . 3 used meet certain minimum standards. SCCP/TCAP capability and subfunctions of the capability set CS1, as they are defined for Service Switching Points—SSPs—in Intelligent Networks, in particular support of the Trigger Detection Points TDP1 (or alternatively TDP2) and TDP12, are presupposed.

For the communication relationships originating from the external subscriber lines TA1, TA3, TA6, TA4 of the group NWHG, the following configuration is set up:

In the switching devices—here LE2 and LE3—with external subscriber lines TA1, TA3, TA4, TA6, assigned to the group NWHG, arranged in them, Trigger Detection Points TDP1 are set up to the respective subscriber lines TA1, TA3, TA4, TA6 or subscriber line lines. The control parameters linked with these Trigger Detection Point TDP1 are set in such a way that, each time a connection setup is initiated by these external subscribers—for example by picking up the receiver (off-hook trigger)—, a program sequence which opens a TCAP transaction with the control switching device LE1 is activated by means of the Trigger Detection Points TDP1. By means of sending a TC_Begin message with an IN message Initial_DP inserted in it, the call number of the respective external subscriber TA1, TA3, TA4, TA6 of the group NWHG is transferred to the control switching device LE1 to indicate that the respective subscriber TA1, TA3, TA4, TA6 is busy.

The control switching device LE1 responds to this with a reply TC_Continue, in which the possible actions to follow this—also referred to as Event Detection Points EDPs—are configured or armed by means of an inserted IN message "Request Report BCSM", as the receiver is replaced—also referred to as "going on-hook". This means that the subscriber switching points LE2, LE3 are requested to transmit a TCAP message once again to the control switching device LE1 when the respective external subscriber TA1, TA3, TA4, TA6 replaces the receiver.

As soon as the connection is ended by the external subscriber TA1, TA3, TA4, TA6—for example by replacing the receiver—a program sequence which transmits the event to the control switching device LE1 by means of a TC_End message with an IN message "Event Report BCSM" inserted in it, and consequently ends the transaction, is activated by means of the correspondingly configured or armed Event Detection Points EDPs in the respective subscriber switching device LE2, LE3.

Alternatively, the same sequence can be achieved if the same actions are linked with the Trigger Detection Point TDP2. This alternative can be used whenever a communication network contains switching devices of other manufacturers in which the Trigger Detection Point TDP1 is not implemented.

As an alternative, notification of the receiver being replaced can be achieved by a separate "On-hook Trigger". In this case, the configuration is constituted by the action of replacing the receiver by means of the message "Request Report BCSM" and consequently also the additionally associated message sequence. The transaction also would not remain open or active up until replacement of the receiver.

In addition, the following configuration is set up for the communication relationships to be forwarded to the external subscriber lines TA1, TA3, TA6, TA4:

Bypassing the hunting over the entire group NWHG, the external subscriber lines TA1, TA3, TA4, TA6 can also be called up directly. In this case, the control switching device LE1 must be informed about the current busy states of the external subscriber lines TA1, TA3, TA4, TA6 when the corresponding subscriber line TA1, TA3, TA4, TA6 or the corresponding access line is no longer available for the line selection via the pilot call number PDN of the group NWHG.

In the switching devices LE2, LE3 in which the respective external subscriber lines TA1, TA3, TA4, TA6 are arranged, Trigger Detection Points TDP12 are set up to the respective subscriber line lines or subscriber lines TA1, TA3, TA4, TA6. The control parameters linked with these Trigger Detection Point TDP12 are set in such a way that, each time a communication relationship are switched to these external subscriber lines TA1, 3, 4, 6—also referred to as "Terminating Line Trigger"—a program sequence which opens a TCAP transaction with the control switching device LE1 is activated by means of the Trigger Detection Point TDP12 in the respective switching device LE2,3, a "TC_Begin message" with an IN message "Initial_DP" inserted in it being transmitted to the control switching device LE1. In this case, the call number of the called external subscriber line TA1, 3, 4, 6 is transmitted to the control switching device LE1 to indicate that the respective subscriber line TA1, 3, 4, 6 is currently busy. The control switching device LE1 responds to this with a corresponding reply "TC_Continue", in which the possible actions to follow this, or Event Detection Points EDPs, are armed by means of an IN message "Request Report BCSM" inserted in it as the receiver is replaced, or while "going on-hook". This means that the corresponding subscriber switching devices LE2, 3 are requested to transmit a corresponding TCAP message to the control switching device LE1 when the receiver of the respective external subscriber line TA1, 3, 4, 6 is replaced.

As soon as replacement of the receiver is detected on the external subscriber line TA1, 3, 4, 6, a program sequence by which the event is transmitted to the control switching device LE1, and consequently the transaction is ended, by means of a TC End message with an IN message "Event Report BCSM" inserted in it, is in turn activated by means of the correspondingly configured Event Detection Points EDPs in the corresponding subscriber switching device LE2, 3.

The subscriber lines TA1 . . . 6 assigned to the group NWHG, or the communication terminals KE1 . . . 6 connected to them, may be assigned further group-specific service features or characteristics, with additional information, representing the further service features and characteristics, being stored in the organization unit OGRP. Examples of further group-specific service features are:

definition of an alternative starting point of the search procedure—for example definition of an additional subscriber call number assigned to a subscriber line TA1 . . . 6, on the dialing-up of which the search procedure begins independently of the preset hunting algorithm in the case of this subscriber line—, definition of a "stop hunt position"—definition of a subscriber line TA1 . . . 6 for which the search procedure is in any event terminated even if a free subscriber line TA1 . . . 6 or a free communication terminal KE1 . . . 6 has still not been found—, definition of a "skip hunt position"—definition of a subscriber line TA1 . . . 6 which is to be temporarily or permanently excluded from the search procedure even if it is currently free.

Examples of further group-specific characteristics which can be assigned to the group NWHG are:

determination of a call number DN1 . . . 6, PDN—for example an individual, ISDN-conformal MSN or the group-individual pilot call number PDN—under which a communication relationship originating from the group NWHG is identifiable, determination of a call number DN1 . . . 6, PDN to which calls are charged when there are communication relationships originating from the group NWHG.

The assignment of the individual subscriber lines TA1 . . . 6 to the group NWHG can be changed at any time. For instance, a subscriber line TA1 . . . 6 can be removed from the group NWHG at any point in time by administration. For this purpose, the corresponding information in the organization unit OGRP representing the subscriber line TA1 . . . 6 to be removed is erased. After a subscriber line TA1 . . . 6 has been removed from the group NWHG, only the already configured, analog or ISDN-conformal subscriber-line-individual subscriber service features are provided by it.

According to an advantageous development of the method according to the invention, the group NWHG can be assigned at least one waiting queue. Waiting queues are usually functions implemented in private branch exchanges that are used for example in call centers. For the assignment of the service feature "waiting queue" to the set-up group NWHG, the organization unit OGRP stored in the control switching device LE1 is assigned a further memory area, by which a number of transient waiting points are realized. A number of incoming communication relationships can be terminated at the transient waiting positions and passed on to an announcing unit. The waiting queue functionality is configured in such a way that communication relationships or connections directed to a subscriber call number DN1 . . . 6 are switched in the way described—via the control switching device LE1—directly to the corresponding communication terminal KE1 . . . 6, provided that the corresponding communication terminal KE1 . . . 6 is free. In the case of communication relationships directed to the group-individual pilot call number PDN of the group NWHG, the group-individual search procedure becomes active. If no free subscriber line TA1 . . . 6 or no free user data channel or no free communication terminal KE1 . . . 6 can be found in the search procedure, the communication relationship concerned is made to wait in turn in the waiting queue. As soon as a subscriber line TA1 . . . 6 or a user data channel or a communication terminal KE1 . . . 6 is found as currently free, the communication relationship made to wait in turn in the waiting queue is forwarded to the subscriber line which has become free. If there are a number of communication relationships waiting in turn in the waiting queue, one communication relationship is selected from the waiting queue by means of a selection procedure and is forwarded. A communication relationship may be selected, for example, with the aid of the FIFO principle or on a priority-controlled basis.

For callers made to wait in turn in the waiting queue, composite announcements can be created. These may have, for example, the following components:

a welcoming, from case to case, an announcement stating at which position the caller has been put into the waiting queue, from case to case, an announcement stating how long the probable waiting time in the waiting queue will be, from case to case, advertising announcements and musical interludes, from case to case, a renewed welcoming announcement directly before the caller is removed from the waiting queue and forwarded.

The "waiting queue" service feature is of interest in particular for service providers whose orders are placed by telephone and in response to which products or values are arranged or delivered. Examples are a "pizza home service", banking business via agents, buying agents or travel agencies. By using the waiting queue, the customers are not turned away in the busy case and can be already provided with preliminary information in the queue. This minimizes the risk of losing a customer.

What is claimed is:

1. A communication arrangement for implementing additional functions for subscriber lines which have respectively configured subscriber service features and are physically assigned to interconnected switching devices, comprising:
at least two switching devices having an assignment device for assigning at least some of the subscriber lines to at least one group, wherein one of the switching devices has a control device for controlling group-individual service features and/or group-individual characteristics which can be assigned to the group,
the assignment device is configured such that, in the switching device controlling the group, the subscriber lines not physically assigned to the controlling switching device are assigned to the group as virtual subscriber lines,
the assignment device is configured such that communication relationships from and to the subscriber lines which are not physically assigned to the switching device controlling the group are switched in the telecommunication sense by the switching device controlling the group,
the control device is configured such that, depending on the communication relationships switched via the controlling switching device, corresponding items of state information representing the current switching and/or operational state of the virtual subscriber lines are derived and stored in the switching device controlling the group, and
the group-individual service features and/or characteristics assigned to the virtual subscriber lines are controlled depending on the respectively currently stored state information.

2. The communication arrangement as claimed in claim 1, wherein the switching devices are an integral part of a higher-level communication network.

3. The communication arrangement as claimed in claim 1, wherein the subscriber lines are configured as at least one of
an analog subscriber line;
an ISDN basic access;
an ISDN primary rate access;
a subscriber line implementing an xDSL transmission method;
a cordless subscriber line for the connection of a cordless communication terminal; and
a mobile-radio-conformal subscriber line for the connection of a mobile, wireless communication terminal.

4. The communication arrangement as claimed in claim 1, wherein stations for switchboard operators or agents of a call center which are assigned to the group are connected to at least some of the subscriber lines, the at least one group being assigned functions and service features of a call center, and the functions and service features of the call center being controlled by the switching device controlling the group.

5. A process for realization of additional functions for subscriber connections, each of which has configured subscriber performance features and which are physically assigned interconnected exchange devices, comprising:
assigning at least a subset of the subscriber connections of at least two exchange devices at least to one group;
assigning to the at least one group, group-individual performance features and/or group-individual characteristics;
controlling the performance features and/or characteristics assigned to the group by one of the exchange devices, and assigning, in the exchange device controlling the group, the subscriber connections of the group which are not physically assigned to the exchange device, as virtual subscriber connections, or administering the exchange devices such that communication connections from and to the subscriber connections which are not physically assigned to the exchange device controlling the group are switched via the exchange device controlling the group;
deriving, in the exchange device controlling the group, as a function of the communications connections switched via the controlling exchange device, status information representing the current status of the virtual subscriber connections and storing it in the exchange device controlling the group; and
controlling group-individual performance features and/or group-individual characteristics assigned to the subscriber connections as a function of the status information currently stored for each.

6. The method as claimed in claim 5, wherein the at least one group is assigned at least one group-individual group call number.

7. The method as claimed in claim 6, wherein, in the case of a communication relationship to be switched to the at least one group-individual group call number, the at least one group is assigned a group-individual search procedure or a hunting algorithm for finding a free subscriber line within the group.

8. The method as claimed in claim 5, wherein an organization unit representing the at least one group is provided in a database of the switching device controlling the group, with
line information representing subscriber lines assigned to the group, and
information representing group-individual service features and/or characteristics assigned to the group
being stored in the organization unit.

9. The method as claimed in claim 7, wherein the group is assigned at least one group-individual waiting queue; in the event that no free subscriber line is found within the search procedure, the communication relationship to be switched is made to wait in turn in the at least one waiting queue and, after finding a free subscriber line, the communication relationship is taken from the waiting queue and forwarded to the free subscriber line.

10. The method as claimed in claim 9, wherein the organization unit is assigned in the database of the switching device controlling the group a memory area representing the at least one waiting queue and realizing at least one waiting position.

11. The method as claimed in claim 7, wherein a subscriber line provides at least one user data channel which can be switched within the search procedure for the transmission of information.

12. The method as claimed in claim 11, wherein the number of user data channels which can be switched within the search procedure for the subscriber line in the case of a subscriber line having a number of user data channels is predeterminable.

13. The method as claimed in claim 7, wherein the subscriber line is assigned at least one subscriber call number, the number of user data channels which can be used simultaneously under a subscriber call number within the search procedure is predeterminable.

14. The method as claimed in claim 5, wherein the virtual subscriber lines are respectively assigned at least one item of addressing information, with the aid of which communication relationships are set up between the switching device controlling the group and the subscriber lines which are not physically assigned to the controlling switching device.

15. The method as claimed in claim 5, wherein the switching devices are interconnected via at least one interexchange line.

16. The method as claimed in claim 5, wherein the switching devices are administered such that a communication relationship to be switched from a subscriber line not physically assigned to the controlling switching device to a destination determined by destination information is switched with the aid of an item of routing information added to the destination information firstly to the controlling switching device and from the latter to the destination.

17. The method as claimed in claim 14, wherein a communication relationship to be switched to a subscriber line not physically assigned to the controlling switching device is forwarded to the switching device controlling the group and subsequently forwarded with the aid of the addressing information assigned to the respective virtual subscriber line to the subscriber line not physically assigned to the controlling switching device.

18. The method as claimed in claim 14, wherein the subscriber lines not physically assigned to the controlling switching device are identified as ported within the switching service feature "Number Portability", a communication relationship to be switched to a subscriber line not physically assigned to the controlling switching device is switched within the switching service feature "Number Portability" to the corresponding switching device, to which the subscriber lines are physically assigned, and subsequently switched by the switching service feature "Number Portability" to the switching device controlling the group and subsequently forwarded with aid of the addressing information assigned to the respective virtual subscriber line to the corresponding subscriber line not physically assigned to the controlling switching device.

19. The method as claimed in claim 14, wherein a communication relationship to be switched to a subscriber line not physically assigned to the controlling switching device is switched to the corresponding switching device, to which the subscriber lines are physically assigned, and subsequently diverted within the switching service feature "Call Diversion" to the switching devic controlling the group, and subsequently forwarded with aid of the addressing information assigned to the respective virtual subscriber line to the corresponding subscriber line not physically assigned to the controlling switching device.

20. The method as claimed in claim 5, wherein at least one communication terminal is respectively connected to the subscriber lines.

21. The method as claimed in claim 5, wherein the subscriber lines are configured as at least one of an analog subscriber line;

an ISDN basic access;

an ISDN primary rate access;

a subscriber line implementing an xDSL transmission method;

a cordless subscriber line for the connection of a cordless communication terminal; and a mobile-radio-conformal subscriber line for the connection of a mobile, wireless communication terminal.

22. The method as claimed in claim 5, wherein the at least one group is assigned functions and service features of a call center, stations for switchboard operators or agents of a call center which are assigned to the group being connected to at least some of the subscriber lines, and the functions and service features of the call center are controlled by the switching device controlling the group.

23. The process according claim 5, wherein the exchange devices are an integral component of a master communications network, where communications connections from and to the subscriber connections which are not physically assigned to the exchange device controlling the group are switched via the exchange device controlling the group.

24. A process for realization of functions for subscriber connections, each of which has configured subscriber performance features and which are physically assigned interconnected exchange devices, comprising:

assigning at least a subset of the subscriber connections of at least two exchange devices at least to one group;

assigning the at least one group, group-individual performance features and/or group-individual characteristics;

controlling the performance features and/or characteristics assigned to the group by one of the exchange devices;

assigning, in the exchange device controlling the group, the subscriber connections of the group which are not assigned to this exchange device as virtual subscriber connections, wherein the exchange devices are administered such that the current statuses, from the standpoint of exchange technology and/or operations technology, of the subscriber connections which are not physically assigned to the exchange device controlling the group are transmitted to the exchange device controlling the group, or each change of the statuses of the subscriber connections which are not physically assigned to the exchange device controlling the group are transmitted to the exchange device controlling the group;

deriving and storing, in the exchange device controlling the group, as a function of the transmitted information, corresponding status information representing the current status of the virtual subscriber connections; and controlling the group-individual performance features and/or group-individual characteristics assigned to the subscriber connections as a function of the status information currently stored for each.

25. The method as claimed in claim 24, wherein items of state information representing the respectively current switching and operational state or the change of the switching and operational state of the subscriber lines not physically assigned to the switching device controlling the group are transmitted with the aid of the Transaction Capabilities Application Part protocol based on signaling protocol No. 7.

26. The method as claimed in claim 25, wherein the items of state information are transmitted by messages controlling functions of an Intelligent Network.

27. A communication arrangement for realization of functions for subscriber connections, each of which has configured subscriber performance features and which are physically assigned interconnected exchange devices, comprising:

an assigner to assign at least a subset of the subscriber connections of at least two exchange devices at least to one group, and to assign the at least one group, group-individual performance features and/or group-individual characteristics;

a controller to control the performance features and/or characteristics assigned to the group by one of the exchange devices;

a second assigner to assign, in the exchange device controlling the group, the subscriber connections of the group which are not assigned to the exchange device as virtual subscriber connections, wherein the exchange devices are administered such that the current statuses, from the standpoint of exchange technology and/or operations technology, of the subscriber connections which are not physically assigned to the exchange device controlling the group are transmitted to the exchange device controlling the group, or each change of the statuses of the subscriber connections which are not physically assigned to the exchange device controlling the group are transmitted to the exchange device controlling the group;

a storage unit to derive and store, in the exchange device controlling the group, as a function of the transmitted information, corresponding status information representing the current status of the virtual subscriber connections; and a second controller to control the group-individual performance features and/or group-individual characteristics assigned to the subscriber connections as a function of the status information currently stored for each.

28. The arrangement of claim 27, wherein the first and second controller are the same controller.

29. The arrangement of claim 27, wherein the first and second assigner are the same assigner.

* * * * *